United States Patent [19]

Valentin

[11] Patent Number: 5,552,050
[45] Date of Patent: *Sep. 3, 1996

[54] DEVICE FOR THE REMOVAL OF CLARIFIED WASTE WATER FROM RECTANGULAR BASINS

[75] Inventor: Franz Valentin, Munich, Germany

[73] Assignee: Hans Huber GmbH & Co. KG, Berching, Germany

[*] Notice: The term of this patent shall not extend beyond the expiration date of Pat. No. 5,423,986.

[21] Appl. No.: 281,367

[22] Filed: Jul. 27, 1994

[30] Foreign Application Priority Data

Aug. 30, 1993 [DE] Germany .............................. 9312978 U

[51] Int. Cl.⁶ .................................................. B01D 21/24
[52] U.S. Cl. ........................................... 210/525; 210/540
[58] Field of Search ..................................... 210/521, 525, 210/526, 527, 519, 538, 540

[56] References Cited

U.S. PATENT DOCUMENTS

| | | | |
|---|---|---|---|
| 2,160,838 | 6/1939 | Dorr | 210/527 |
| 3,437,212 | 4/1969 | Thorn et al. | 210/525 |
| 3,447,688 | 6/1969 | MacCabe | 210/540 |
| 3,774,770 | 11/1973 | Sparham et al. | 210/527 |
| 4,473,467 | 9/1984 | Marcotte | 210/525 |
| 4,957,628 | 9/1990 | Schulz | 210/521 |
| 4,994,179 | 2/1991 | Keeter et al. | 210/540 |
| 5,089,136 | 2/1992 | Cyr | 210/521 |
| 5,395,527 | 3/1995 | Desjardins | 210/525 |

*Primary Examiner*—Christopher Upton
*Attorney, Agent, or Firm*—George W. Dishong

[57] ABSTRACT

The invention relates to a device for the removal of clarified waste water from rectangular basins, which device has at least one completely filled submerged pipe (16; 16) disposed underneath the water surface in the rectangular basin, the arrangement and design of said pipe being of the type suitable for a two-dimensionally uniform take-off of the clarified waste water over the entire basin (10).

10 Claims, 3 Drawing Sheets

DEVICE FOR THE REMOVAL OF CLARIFIED WASTE WATER FROM RECTANGULAR BASINS

BACKGROUND OF THE INVENTION

The invention relates to a device for the of clarified waste water from rectangular basins.

In sewage engineering, secondary sedimentation basins having a rectangular plan view are being used to an increased extent in sewage treatment plants. In these basins, the phases are separated by the sedimentation of the heavy sludge particles and the purified waste water undergoes a vertical movement in the direction of the surface.

So that said vertical movement is not disturbed by the flow processes in the basin, the outlet system for the purified waste water should be designed so that a two-dimensionally constant inflow to the outlet system is ensured.

Hitherto, suspended outlet troughs have predominantly been used as outlet systems. Said troughs draw off the clarified waste water as collecting troughs. The flow in the trough is governed by the fact that the throughput increases in the flow direction but the flow depth has to decrease. The openings into the outlet trough have to be adapted to this circumstance, and this means that either the number of openings decreases in the flow direction or, alternatively, the passage area of the openings decreases in the flow direction.

For this reason, the dimensioning of said outlet troughs is difficult because the uniformity of the influx depends on the accuracy of the calculation. Since the transfer velocity is controlled by means of height differences between basin and trough in the centimetre range, the dimensioning is subject to uncertainties.

The suspended troughs having an open surface have, in addition, some disadvantageous properties. On the one hand, they have to be cleaned at great expense. This is a consequence of the growth of algae in the region of the open surface. On the other hand, they have the largest flow area where the velocities are lowest. The water depth at the start of the trough is greatest because of the characteristics of the collecting trough. Wind action affects the flow.

SUMMARY OF THE INVENTION

The object of the invention is not only to impede the algae growth substantially in the case of such clarification-basin draining devices and to make the take-off as independent as possible of wind action, but also to make the flow more uniform at the same time.

According to the invention, this is achieved in the case of a device for the removal of clarified waste water from rectangular basins by at least one completely filled submerged pipe disposed underneath the water surface in the rectangular basin, the arrangement and design of said pipe being such that provision is made for a two-dimensionally uniform take-off of the clarified waste water over the entire basin.

Preferably, every pipe has approximately the same intake area.

In the field of pipe measurement and specification, the use of the expression DN represents that pipe does not have a consistent diameter primarily as a consequence of the manufacture process. The diameter of a particular pipe specified as being DN 500 simply means that the nominal diameter is 500 units of measure, in this instance the unit of measure is in millimeters. A pipe DN 500 will have a diameter over the length of the pipe which may vary by 50 mm. However, rather than specify the pipe as having a diameter of 500 mm+ or −25 mm, the diameter of the pipe is characterized by the measure DN 500. Throughout, DN xxx shall mean a nominal/average diameter dimension of xxx millimeters (mm).

Expediently, the pipes are disposed 20–30 cm below the water-level surface of the basin and at least 30 cm below said surface for pipes having nominal diameters of >DN 500. The consequence is that flow through the submerged pipes takes place under pressure and the provision of inlet openings on the submerged pipe is therefore non-critical.

Preferably, to promote a uniform take-off velocity over the extension of the submerged pipe or pipes, slots are provided in the submerged-pipe wall or walls, the slot length being of suitably variable design from the point situated opposite the discharge to the discharge itself.

In general, the slots will have a width of at least 10 mm.

As a result of the take-off of the purified waste water at a fixed minimum depth below the surface with certain adjustments of the parameters, the take-off is rendered appreciably more uniform. In this way the algae growth is substantially impeded. A uniform take-off over the basin is nevertheless ensured, even in the case of appreciable wind action.

Expediently, as a result of gradations in the diameter, the pipes are dimensioned so that, with the exception of the beginning of the pipe, minimum flow velocities are maintained. The diameter of the outlet system will increase in the flow direction. As a result, the available flow cross section is always fully utilized.

The uniform influx of the outlet system is ensured by a hydraulically optimized adjustment between pipe diameter, pipe internal pressure and inlet opening to the pipes, and this is promoted particularly by the inlet openings which are designed as slots and have variable length. It is possible to adjust the slot length in such a way that the same inflow can be achieved for every slot.

The two-dimensionally uniform take-off over the basin surface is achieved in that, as a result of the combination of pipe spacing with the spacing of the inlet openings into the pipe, the same basin surface is associated with every opening in the outlet system. Said system functions independently and regardless of the throughput.

Expediently, at the outlet of the system, a controller will optionally keep the basin water level constant.

Thus, the outlet controller may comprise, for example, height-adjustable crests, outflow beneath a flat sluice gate with variable outflow gap, or even by means of flat slide valves in the pipeline itself.

The inlet openings to the submerged pipe can be designed as slots in such a way that, as a result of variations in the slot length, a precise adjustment to the hydraulic boundary conditions becomes possible.

Expediently, the submerged pipe is designed for a maximum discharge velocity of, in particular, 0.32 m/sec and exactly the same discharge velocity in every pipe section as a result of a combination of slots which become smaller towards the discharge and widening pipe diameter to improve the uniformity of the flow towards the submerged pipe.

Expediently, the graded pipes may be of flush design at the top and of stepped design at the bottom.

If an asymmetrical arrangement of the pipes is necessary because of the raker arrangement in a basin, two and a half pipes may, for example, be provided, the "half pipe" also having only half the capacity. The slots are designed only half, as large.

As a result of the design of the depth below the water surface as 20 to 30 cm to the top of the pipe, inlet losses are largely avoided and an adequate overpressure is maintained over the entire length. Dangers due to unduly shallow depths of cover and, consequently, air intake via vortices are avoided.

In general, the slots have a rectangular shape with rounded corner radii of slot width at the ends, and in the case of a minimum diameter of the pipes of >DN 300, it is 10 mm.

The velocity level in the pipe is limited to approximately 5 mm, which corresponds to a maximum velocity in the pipe of approximately 0.32 m/sec. The velocity variations in the pipe are then 0–32 cm/sec in the first section, and about 0.2–0.32 m/sec in the second and subsequent sections. Slight variations are unavoidable because of the gradation of the diameter in the 50 mm range.

In general, the slots are provided at the top of the pipe but, under no circumstances, at the bottom of the pipe, primarily, inter alia, because this would result computationally in an unduly deep outflow in the case of fairly large pipes.

An exemplary design of a rectangular basin is 40 m long, 10 m wide and 7 m deep. In this case, for example, 3 pipes may be provided in the longitudinal direction with equal spacing from one another and with nominal-diameter gradations of DN 300, 400, 500 and 550.

In the case of a symmetrical arrangement and with a slot spacing of 0.5 m, each slot removes water from an area of 0.5×10/3 m=1.66 m².

BRIEF DESCRIPTION OF THE DRAWINGS

Exemplary embodiments of the invention will now be explained in greater detail with reference to the accompanying drawings. In these drawings.

DETAILED DESCRIPTION OF THE INVENTION

Figure 1:
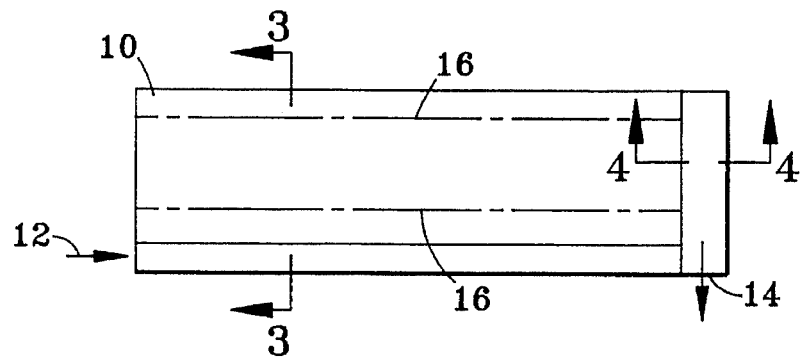
FIG. 1 shows the plan view of a basin.

The basin 10 shown in FIG. 1 has an inlet 12 and an outlet 14 and, in the exemplary embodiment, it is provided with continuous pipes 16 virtually over the entire basin length. The pipes discharge in the outlet 14. The pipes have the same spacing from one another. A uniform influx during inflow already takes place from the inlet trough extending over the entire basin length in the exemplary embodiment.

Figure 2:
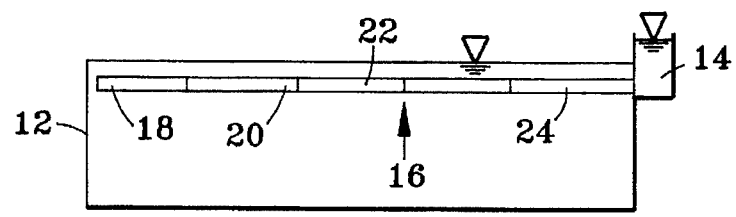
FIG. 2 shows the longitudinal section through a basin.
Figure 3:
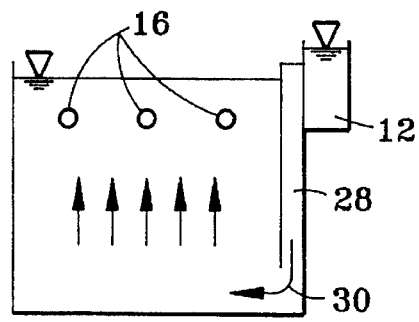
FIG. 3 shows a diagrammatic cross section through a basin.

FIG. 2 illustrates a longitudinal section of FIG. 1. A single pipe 16 with the gradations from the side situated opposite the discharge to the discharge into the outlet can be seen, which gradations are denoted, for example, by 18, 20, 22 and 24. Gradations of nominal diameters DN 300, 400, 500 and 550 (reference symbols 18, 20, 22, 24) result for a large basin of, for example, 40×10×7 m. FIG. 3 shows a cross section through the basin along III/III in FIG. 1. The upwards directed flow towards the pipes 16 and the inlet 12 via the distributing inlet trough 28 are shown. The flow distribution into the basin is indicated at 30.

Figure 4:
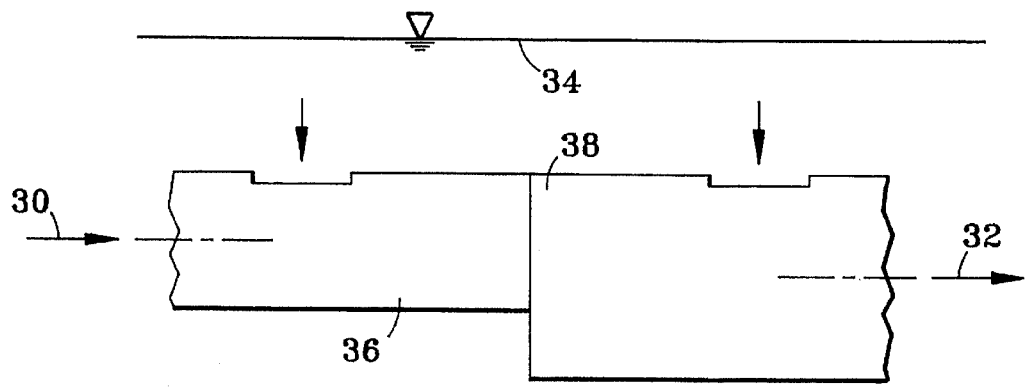
FIGS. 4 and 5 show the design of pipes.
Figure 5:
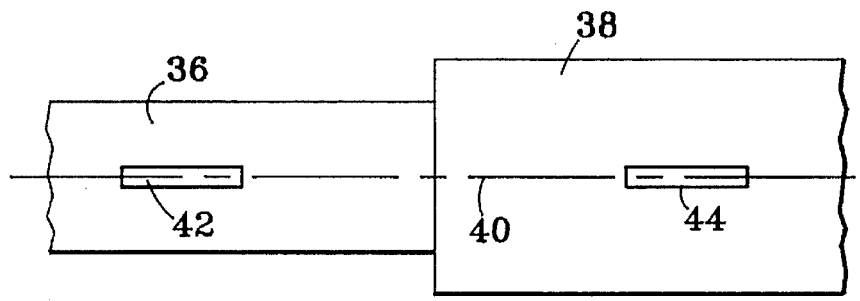

FIG. 4 is a larger diagram of the troughs of FIG. 2, in which slots can additionally be seen. According to this embodiment (only a single submerged pipe is shown), said submerged pipe is stepped in increasing cross sections from the inflow side to the outflow side, the pipe extending in a flush manner at the top and in a stepped manner the bottom, as FIGS. 4 and 5 show. The flow takes place from left 30 to right 32, and the submerged pipe which is always disposed beneath the water level 34 (of the basin) receives a uniform flow. The cross sections of the rectangular slots are adjusted to the inflow, i.e. in the case of 36 a smaller cross section, and in the case of 38 the larger cross section because, after all, more water is already flowing in. In the plan view, it is seen that the pipe sections are disposed symmetrically with respect to one another in relation to a centre axis 40. In the case of this embodiment, the slots 42, 44 become smaller towards the outlet, i.e. the length in the case of 42 is larger than the length in the case of 44. This results in rendering the flow more uniform. The result is achieved that, for example, a maximum flow velocity of 0.30–0.32 m/sec can be maintained.

Figure 6:
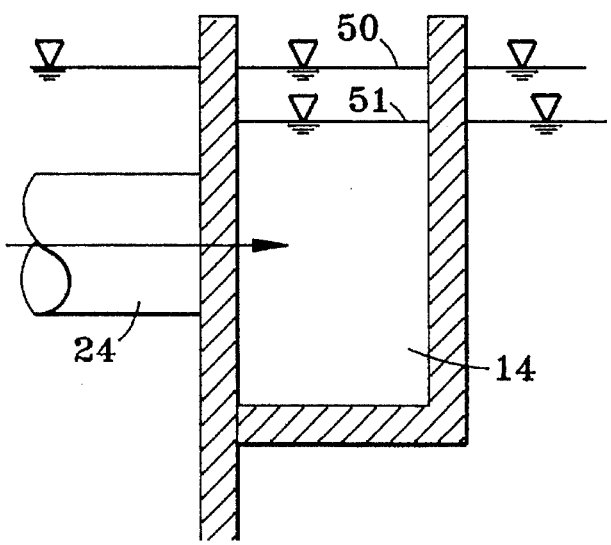
FIG. 6 shows the cross section through an outlet trough.
Figure 7:
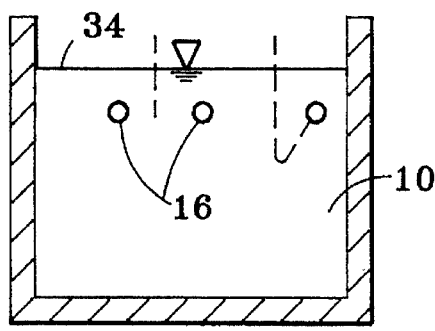
FIG. 7 is an asymmetric arrangement of pipes in a basin.
Figure 8:
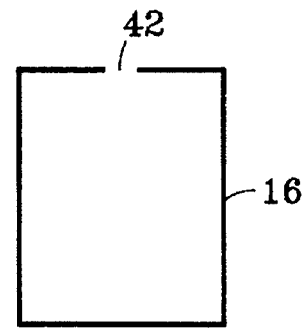
FIG. 8 is a sectional view of a rectangular pipe.
Figure 9A:
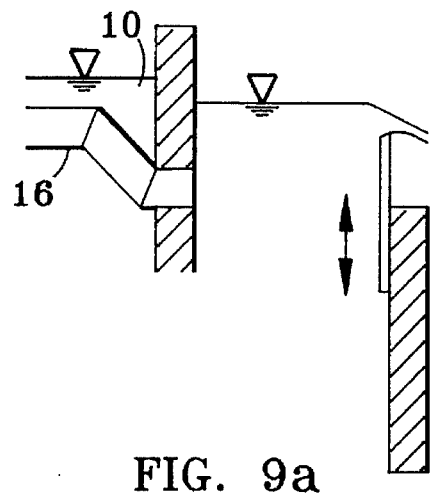
FIG. 9a is an embodiment of an outlet control means for keeping a constant level in the basin by crest overflow.
Figure 9B:
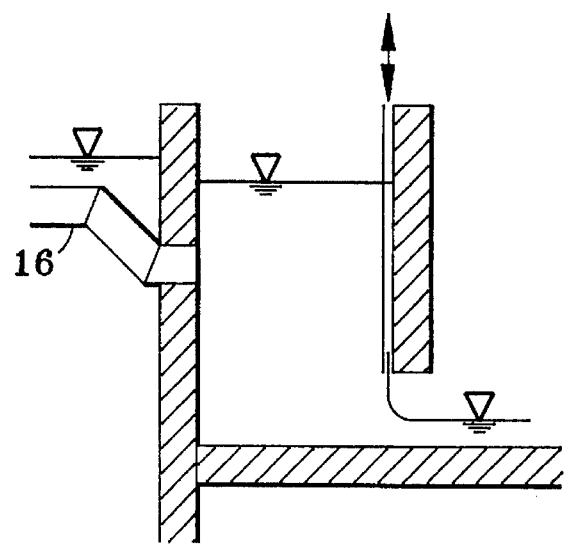
FIG. 9b is an embodiment of an outlet control means for keeping a constant level in the basin by sluice gate.
Figure 9C:
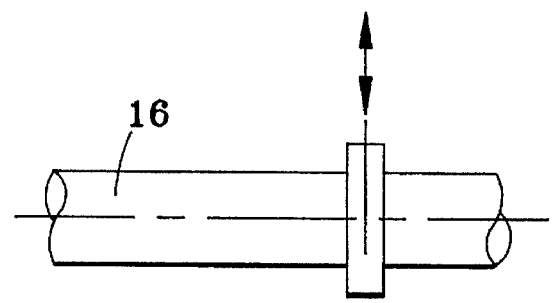
FIG. 9c is an embodiment of an outlet control means for keeping a constant level in the basin by control valve.

FIG. 6 shows the cross section through the outlet trough 14 and the inlet of the pipe section 24 into the outlet trough which drains uniformly and transversely over the basin-length extension.

At the top, a water level 50 is indicated for a minimum throughput and, further down, a water level 51 for maximum throughput.

According to other embodiments, the transition to the larger pipe diameters may also take place virtually continuously and gradually.

The slots, which become smaller towards the outlet, prevent the maximum velocity from being exceeded.

The favourable combination of widening the pipe towards the outlet while simultaneously reducing the slot length in the case of such rectangular pipes in rectangular basins prevents the possible precipitation of entrained sludge flakes due to the tractive stresses, which are then smaller.

Known proposals (SU-PS 1367998 A1) with closure devices on various pipes do not achieve the object set here and they are expensive and have high maintenance costs.

I claim:

1. A device for the removal of clarified waste water from a rectangular basin the device comprising: at least one pipe completely submerged underneath the water surface in the rectangular basin, the at least one pipe having a clarified water inlet opening through which clarified water enters the pipe and a clarified water outlet through which the clarified water is discharged into an outlet of the basin, the inlet openings being arranged to provide a two-dimensionally uniform take-off of the clarified waste water over the entire basin, wherein the inlet opening to the at least one pipe is a plurality of slots of varying slot length to precisely adjust hydraulic boundary conditions.

2. The device as claimed in claim 1, wherein, to promote a uniform take-off velocity over an extension of the at least one pipe the slots are provided at a top portion of the at least one pipe and the slot length varies along the extension of the at least one pipe.

3. The device as claimed in claim 2, wherein the slot length of the slots decreases towards the outlet of the at least one pipe.

4. The device as claimed in claim 1, wherein the at least one pipe has a cross section which increases towards the outlet starting at a point situated opposite the outlet.

5. The device as claimed in claim 4, wherein the at least one pipe gradually widens in steps.

6. The device as claimed in claim 4, wherein the at least one pipe gradually widens, the at least one pipe being flush along a top portion and having steps along a bottom portion.

7. The device as claimed in claim 1, wherein the at least one pipe is designed for a maximum discharge velocity of and exactly the same discharge velocity in each section of the pipes as a result of a combination of slots, comprising the opening, which become smaller towards the outlet and a widening diameter of the at least one pipe toward the outlet.

8. The device as claimed in claim 1, wherein the minimum slot width is 10 mm.

9. The device as claimed in claim 1, wherein, in the case of a symmetrical arrangement with a slot spacing of 0.5 m, each slot removes water from an area of 1.66 m$^2$.

10. The device as claimed in claim 1, wherein the slots have a rectangular cross section shape, a minimum width of 10 mm in the case of the at least one pipe having a nominal diameter of 300 and rounded corner radii equal to the slot width.

\* \* \* \* \*